United States Patent
Raghavan et al.

(10) Patent No.: US 9,965,497 B2
(45) Date of Patent: May 8, 2018

(54) MOVING DATA BETWEEN PARTITIONS

(71) Applicant: Oracle International Corporation, Redwood Shores, CA (US)

(72) Inventors: Ananth Raghavan, San Francisco, CA (US); George Eadon, Hollis, NH (US); Ramesh Kumar, San Francisco, CA (US); Hermann Baer, San Mateo, CA (US); Suresh Sridharan, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 124 days.

(21) Appl. No.: 14/289,926

(22) Filed: May 29, 2014

(65) Prior Publication Data
US 2015/0347401 A1    Dec. 3, 2015

(51) Int. Cl.
*G06F 17/30* (2006.01)
(52) U.S. Cl.
CPC .................... *G06F 17/303* (2013.01)
(58) Field of Classification Search
USPC ................................................. 707/703, 809
See application file for complete search history.

(56) References Cited

U.S. PATENT DOCUMENTS

| | | | | |
|---|---|---|---|---|
| 6,336,134 B1* | 1/2002 | Varma | ................ | H04L 12/1813 709/201 |
| 7,136,883 B2* | 11/2006 | Flamma | ................ | G06F 3/0601 |
| 7,334,002 B2* | 2/2008 | Byrne | ................ | G06F 11/1471 |
| 8,195,702 B2 | 6/2012 | Shankar et al. | | |
| 8,291,191 B2* | 10/2012 | Barbarek | .......... | G06F 17/30339 707/756 |
| 8,893,131 B2* | 11/2014 | Ramakrishnan | .. | G06F 17/30339 707/812 |
| 9,053,167 B1* | 6/2015 | Swift | ................ | G06F 17/30575 |
| 2014/0025652 A1* | 1/2014 | Lew | ................ | G06F 17/30336 707/696 |

(Continued)

OTHER PUBLICATIONS

Oracle® Database VLDB and Partitioning Guide, 11g Release 2 (11.2), "Maintaining Partitions", http://docs.oracle.com/cd/E11882_01/server.112/e25523/part_admin002.htm, last viewed on Nov. 6, 2014, 60 pgs.

*Primary Examiner* — Kim Nguyen
(74) *Attorney, Agent, or Firm* — Hickman Palermo Becker Bingham LLP; Daniel D. Ledesma (57) ABSTRACT

Techniques are provided for moving data between partitions. Such a process may be performed without requiring any locks that block transactions that target a partition from being executed. Instead, such transactions may proceed while a move operation is being performed. The move operation involves copying data from the targeted partition to another partition that is hidden from (or "invisible" to) those transactions that attempt to read from or write to the partition. During the move operation, changes that are made to the partition are also reflected in a journal. Eventually, the changes reflected in the journal are drained and applied to the hidden partition. Once the partition and the hidden partition are synchronized, the identities of the partitions are swapped so that future transactions will target the previously-hidden partition instead of the previously-viewable partition.

26 Claims, 5 Drawing Sheets

(56) References Cited

U.S. PATENT DOCUMENTS

2014/0082301 A1\* 3/2014 Barton .............. G06F 17/30575
711/153
2014/0089280 A1\* 3/2014 Palay ................ G06F 17/30312
707/696

\* cited by examiner

MOVING DATA BETWEEN PARTITIONS

FIELD OF THE DISCLOSURE

The present disclosure relates to databases, and more particularly to avoiding locks on data when moving data between partitions.

BACKGROUND

In database systems, many resources (such as data blocks, tables, indexes) are shared among multiple processes. Even though resources may be shared, many resources may not be used by more than one process at a given time. For example, sometimes, tables stored on a storage medium may be concurrently accessed in some ways (e.g., read) by multiple processes, but accessed in other ways (e.g., written to) by only one process at a time. As a result, mechanisms have been developed to control access to resources.

One such mechanism uses locks. A lock is a data structure that indicates that a particular process has been granted certain rights with respect to a resource. There are many types of locks, some of which may be shared by many processes, while other types prevent any other locks from being granted on the same resource.

Types of Locks

There are numerous types of locks that may be granted with respect to a particular resource. One type of lock is a shared (S) lock. An S lock on a table grants a process permission to read the table and guarantees that other processes cannot write to the table; however, the S lock does not guarantee that other processes cannot read the table.

Another type of lock is an exclusive (X) lock. An X lock on a table grants a process permission to read from and write to a table and guarantees that other processes cannot read from or write to the table.

Another type of lock is a subexclusive (SX) lock. An SX lock on a table grants multiple processes permission to read from and write to the table, but prevents S locks and X locks from being granted on the table. A common scenario in which a SX lock is used is when multiple processes are affecting different rows of the same table.

Types of Database Statements

There are at least two types of database statements which, when executed, require locks on certain database objects: data manipulation language (DML) statements and data definition language (DDL) statements. Non-limiting examples of DML statements include INSERT, UPDATE, and DELETE. Non-limiting examples of DDL statements include CREATE, DROP, and ALTER. DML statements modify entries (e.g., rows) in tables and indexes while DDL statements define a table or index, such as by adding a column, dropping a partition, or modifying a constraint on a column.

Multiple DML statements are usually included in a single database transaction. The processing of a database statement typically entails parsing (or compiling) the database statement and then executing the database statement. One or more processes that parse and/or execute a database statement acquire locks while the database statement is processed.

A database transaction is a unit of work performed within a database management system (or similar system) against a database and, thus, does not perform any function in and of itself. Nevertheless, the discussion hereinafter, for purposes of brevity, states that a database transaction (or a database statement) performs some function relative to a lock. For example, "a database transaction acquires a lock" is shorthand for "one or more processes that process a database transaction acquire a lock."

In high traffic database systems, it is important to allow multiple DML statements to update a single table concurrently. However, if locks were granted to DML statements on a per-table basis, then only one DML statement would be able to access a table at any instant. Mechanisms have therefore been developed for allowing multiple DML statements to update a single table or index. For example, DML statements may obtain locks at the granularity of a single row of a table in order to allow other DML statements to acquire locks on other rows of the table concurrently.

Moving a Partition

However, some DDL statements require a lock on an entire table, partition, or index. One such DDL statement is a statement (e.g., MOVE PARTITION) which, when executed, causes a partition to be moved, for example, from one tablespace to another. Once issued, a MOVE PARTITION statement "waits" for any DML statements that currently hold locks on the corresponding partition to complete before processing of the MOVE PARTITION statement begins. Once a lock on the partition is acquired, any DML statements that require a lock on the same partition (or on a row of the partition) must wait until the MOVE PARTITION statement completes.

Figure 1:
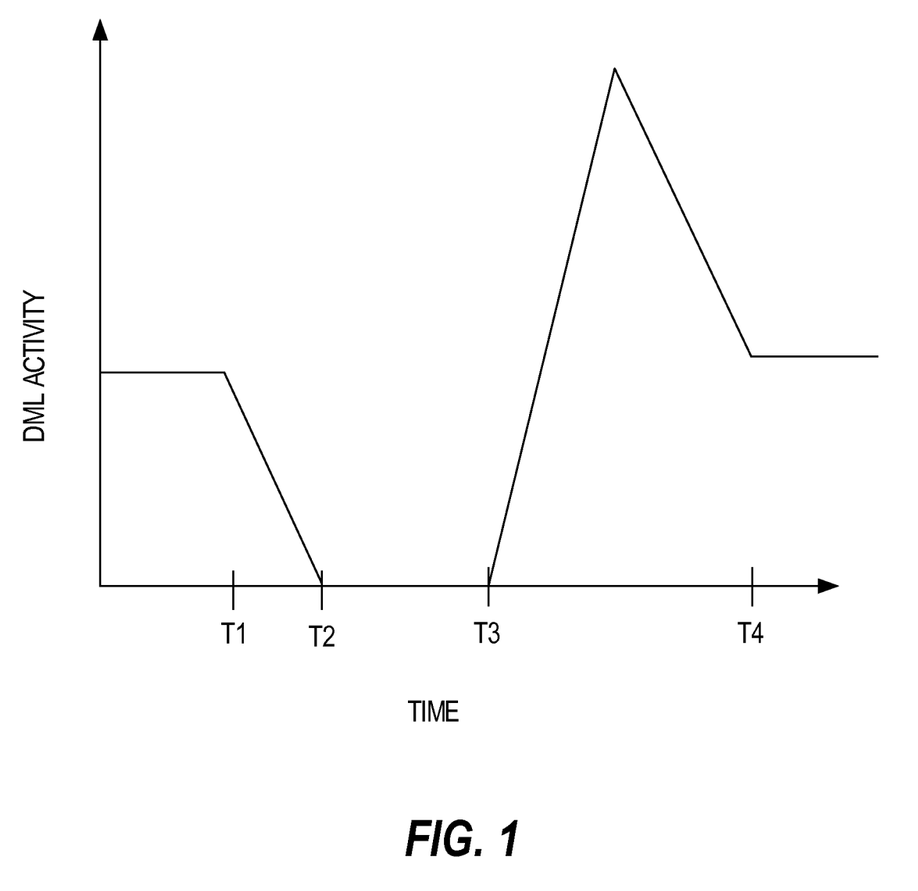
FIG. 1 is a graph that illustrates the effect on DML activity that a "destructive" DDL statement has when processed.

FIG. 1 is a graph that illustrates the effect on DML activity that MOVE PARTITION statements have when issued. At T1, a MOVE PARTITION statement is issued. Subsequently, the MOVE PARTITION statement must wait until any DML statements that hold locks on the corresponding partition to complete. Also, any DML statements (1) that are issued after the MOVE PARTITION statement and (2) that require a lock on the corresponding partition must wait until the MOVE PARTITION statement is executed and releases its lock.

By T2, all DML statements that were issued before the MOVE PARTITION statement have completed. Also at T2, the MOVE PARTITION statement begins executing. As part of its execution, the MOVE PARTITION statement acquires a lock on the partition. At T3, the MOVE PARTITION statement completes and releases the lock on the partition. The period between T3 and T4 indicates an increase in DML activity above the "normal" threshold in order to process the DML statements that were blocked on the MOVE PARTITION statement.

In high traffic websites that are supported by one or more underlying database systems, the "dip" (i.e., between T1 and T3) in DML activity is unacceptable because the "dip" indicates that some users are waiting longer for transactions to complete than such users normally would wait. Thus, overall user experience suffers, which may result in some users choosing to visit other websites. Furthermore, a database system may not have enough resources to process the backlogged DML statements in addition to the DML statements that are received in the normal course of business, which may cause additional delays in processing the DML statements.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to techniques described herein, an instruction to move data between partitions is processed without acquiring locks that block database transactions. Such an operation is said to be an online operation in that the instruction may be fully processed without blocking other processes from accessing any of the partitions. The instruction may come in the form of a database statement, such as a DDL statement.

Techniques to move data from one partition to another storage location are provided below. Moving data from one partition to another (new) partition is referred to herein as "move partition." However, the techniques described herein are applicable to types of operations other than "move partition," such as split partition and merge partition.

Database Transactions

A database statement is executed in the context of a database transaction. When a database transaction completes (i.e., commits), any changes to database objects and/or metadata of the database objects are made visible to other database server processes.

Multiple DML statements are usually included in a single database transaction, whereas a database transaction that includes a DDL statement usually includes no other types of database statements. A database transaction that includes one or more DML statements is referred to hereinafter as a "DML transaction." A database transaction that includes a DDL statement (such as a MOVE PARTITION statement) is referred to hereinafter as a "DDL transaction."

Example Process

Figure 2A:
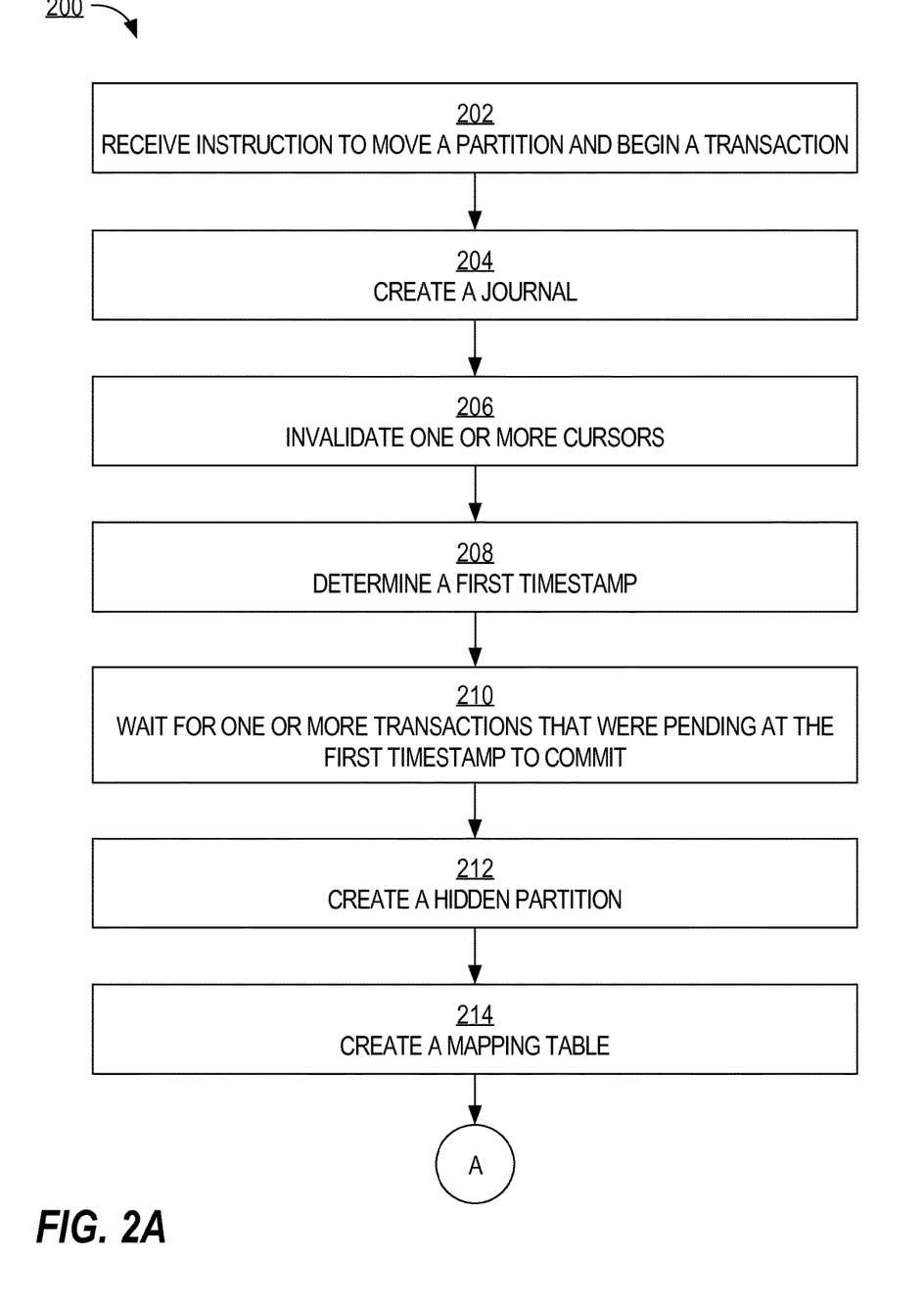
FIGS. 2A-2C are flow diagrams that depict a process for processing an instruction to move a partition without requiring any locks that would block DML transactions, in an embodiment.
Figure 2B:
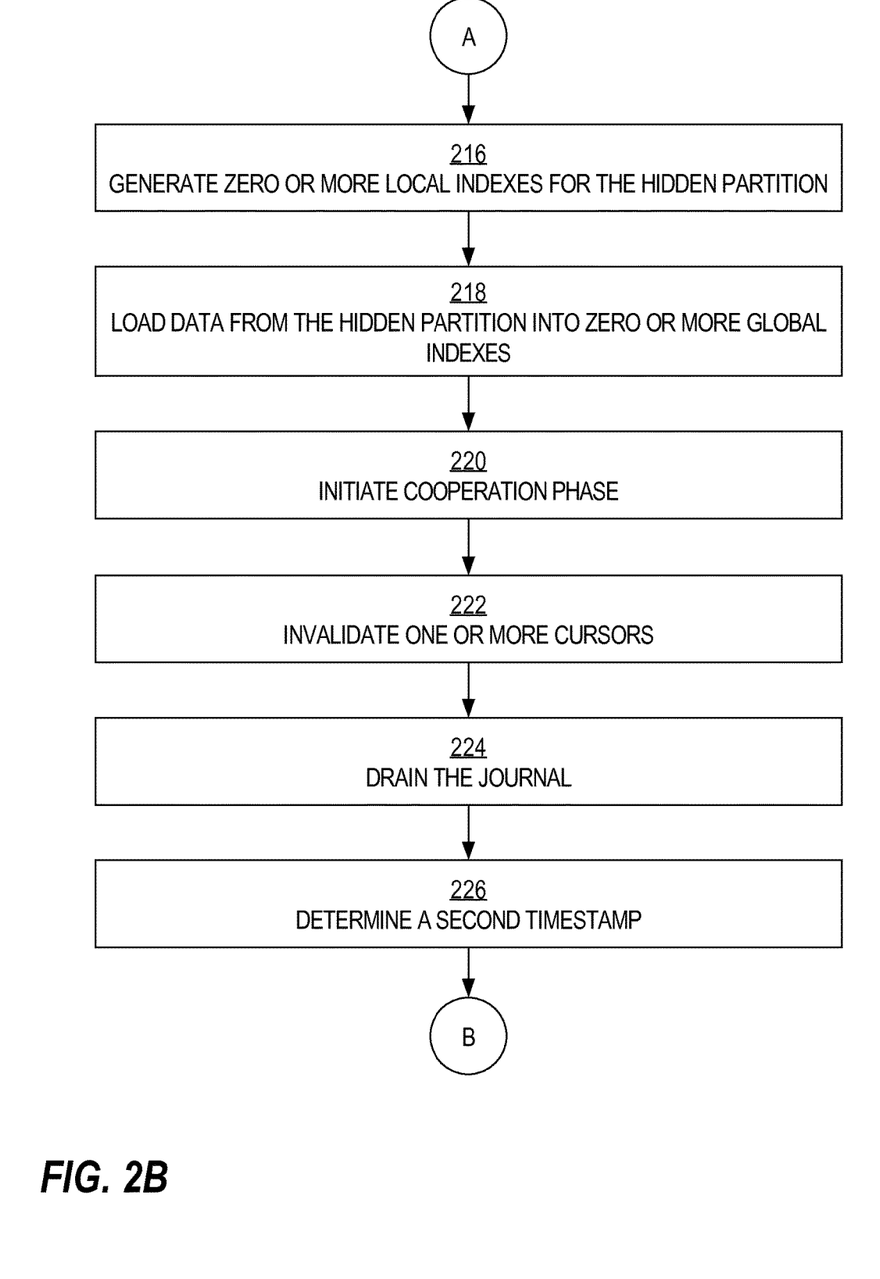
Figure 2C:
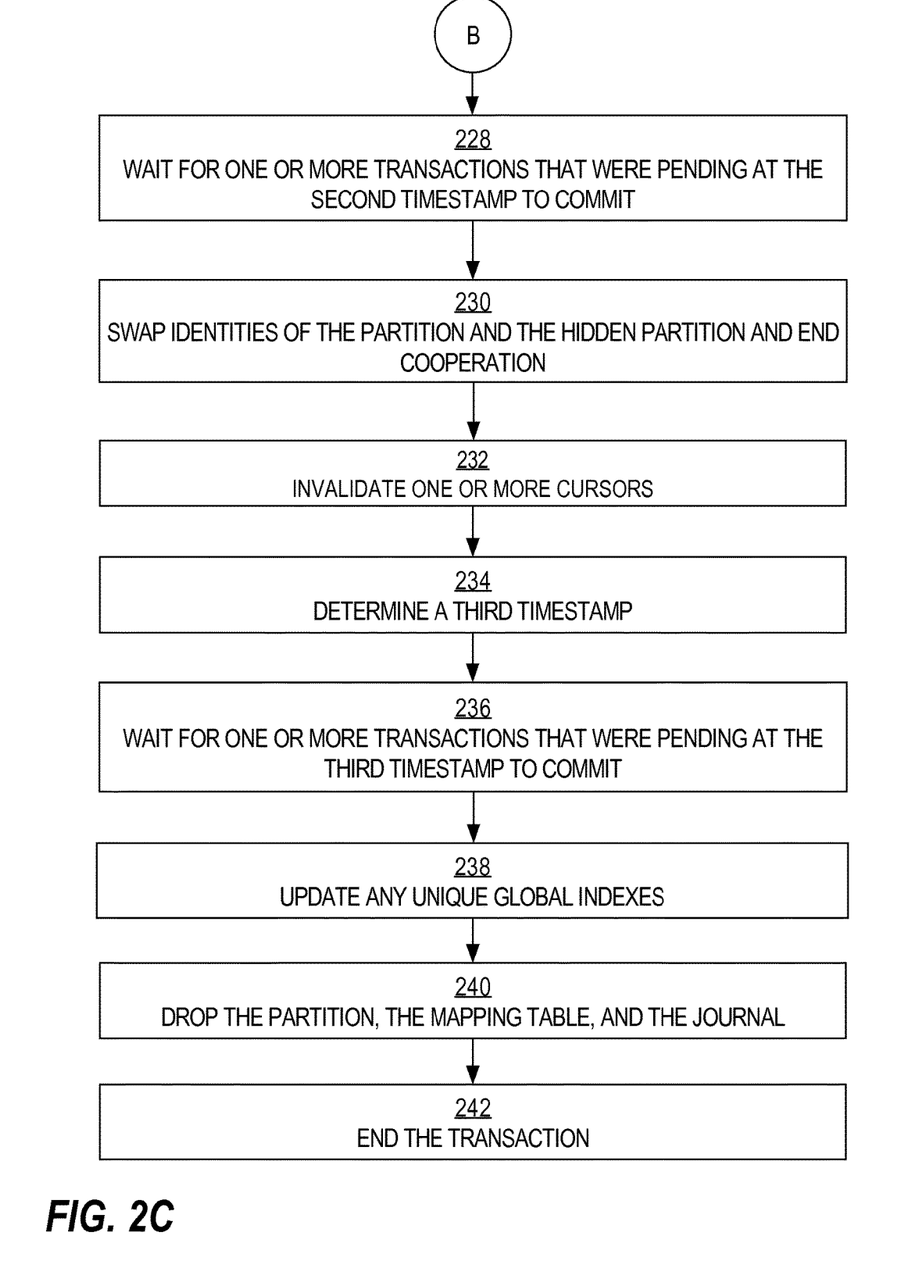

FIGS. 2A-2C are flow diagrams that depict a process 200 for processing an instruction to move a partition without requiring any locks that would block DML transactions, in an embodiment. Process 200 may be performed by a database server process that is executing within a database management system.

At block 202, a move partition instruction is received and a DDL transaction begins. The move partition instruction indicates a partition and a location where the partition is to be moved. Such a location may be logical storage location or a physical storage location. For example, the location may be a different tablespace than the one in which the partition is currently stored or may be a different location within the tablespace in which the partition is currently stored. The instruction may also indicate a name for the partition that is to be stored at the location. If not, then the name of the existing partition may be used.

At block 204, journaling is initiated or "turned on" with respect to the partition. "Journaling" refers to the process of recording changes to data in a "journal" or data structure that is separate from the partition. Thus, any processes that update the partition also record changes to the journal. Changes may indicate the type of change (e.g., insert, delete, or update) (also referred to as an "opcode") and a location identifier that identifies where the inserted, updated, or deleted value is located, such as a row number. The location identifier may indicate an object identifier (such as a number that internally uniquely identifies the partition relative to other database objects) and an offset into the identified object or a row number (e.g., that is not unique across multiple database objects) within in the identified object. While the journal may contain the entire row of the partition that is changed or at least the values that are changed (inserted, updated, or deleted), the journal does not need to contain such information because those values are reflected in the partition. Example data structures for a journal include an index organized table (or IOT), an array, a linked list, and a text file.

In an embodiment, the journal includes only one instance for each location identifier (referred to herein as a "row ID") indicated in the journal. For example, if one change is an update to the row at r3 and a subsequent change is another update to the row at r3, only one of those changes is reflected in the journal. As another example, one entry in the journal may be (I, r4) indicating an insert at row 4. Later, an update is made to row 4. The journal includes either the entry for the insert or an entry for the update, but not both. As another example, one entry in the journal may be (I, r7), indicating an insert at row 7. Later, a change occurs and the change is a delete of that row. The journal does not include either change since the delete effectively cancels the insert.

Invalidating Cursors

In an embodiment, process 200 includes block 206, which involves invalidating any cursors that target the partition. A cursor is a data structure that stores a database statement and an execution plan for the database statement. A cursor is useful if a database statement (e.g., a query) that is identical (or semantically equivalent) to a previous database statement can use the cursor that was generated for the previous database statement during a compilation phase. Compiling a database statement requires a non-trivial amount of time and resource. Thus, "sharing a cursor" allows the compilation phase of processing to be skipped altogether for a subsequent databases statement.

"Invalidating" a cursor causes the cursor to be unusable to subsequent database statements. For example, the cursor is deleted altogether or a flag is set that indicates that the cursor should not be shared. If a cursor associated with the database object is not invalidated, then a database statement that begins after block 210 may attempt to use that cursor, which will not indicate that journaling is to occur.

Block 206 may be part of a second database transaction (also referred to as a "sub" transaction) that is within the DDL transaction that began at block 202. Thus, the ending of block 206 may involve committing the second database transaction. The DDL transaction is considered a parent or outer transaction relative to the second database transaction. A sub transaction is a transaction whose changes, if committed while the outer transaction is pending, are not undone or rolled back if the outer transaction fails to commit.

Waiting

At block 208, a timestamp is determined. The timestamp is associated with a particular time at which (or after which) block 206 ended. Thus, the timestamp may indicate when block 206 completed. A timestamp may comprise a date and time that includes milliseconds or microseconds. Alternatively, a timestamp may be a monotonically increasing number, such as a sequence change number (SCN) that no two transactions (that might execute concurrently) share.

At block 210, the DDL transaction "waits" for one or more transactions that were pending at the particular time (associated with the timestamp) to commit. Such transactions may be all concurrent transactions or only those that involve the partition or table to which the partition belongs. Waiting for only those transactions that involve the partition to commit has the advantage that the waiting period may be much shorter than waiting for all transactions (regardless of which database object they target) that were pending at the particular time to commit.

"Waiting" may involve analyzing a transaction data that indicates a number of transactions and associated timestamp for each transaction. The transaction data may store data about committed transactions, such as an end timestamp associated with each committed transaction. Alternatively, the transaction data only includes information about pending transactions. Thus, if a transaction commits, then data about that transaction is removed from the transaction data.

If the transaction data indicates that there is at least one pending transaction that began before the timestamp (determined in block 208), then the DDL transaction continues to "wait" until all pending transactions that began before the timestamp have committed. Alternatively, if the transaction data indicates that no transaction that involves the partition (or corresponding table) is currently pending, then process 200 proceeds to block 212, even though there may be other transactions that are pending that began before the timestamp.

In an embodiment, "waiting" is initiated by (in the context of the DDL transaction) calling a function that takes, as input, the timestamp (e.g., a SCN) determined in block 208 and an object identifier that identifies the partition that is identified by the DDL statement.

One or more transactions that modify the partition may have started prior to block 206 and not yet completed. Such transactions may involve execution plans that were generated based on the state of the partition prior to the metadata of the database object being modified in block 206. (Invalidating a cursor is considered a metadata change.) Such transactions should see a consistent view of the database object before any modifications to the database object are made. Else, errors may arise. Therefore, block 212 is not performed until block 210 is complete.

Hidden Partition

At block 212, a new partition is created. Block 212 may be part of a sub transaction that began after block 210. Such a partition is referred to herein as a "hidden partition" because information about the hidden partition (such as name, storage location, or size) is not exposed (or "visible") to end users or processes outside the DDL transaction. Thus, no instructions will be received that target the hidden partition. The only processes that "see" the hidden partition are the processes that are involved in the move partition instruction.

Block 212 also involves transferring data from the partition (referred to herein as "P1") to the hidden partition (referred to herein as "HP1"). Such a transfer of data and creation of HP1 may be initiated by processing the following automatically-created statement:

CREATE HP1 AS SELECT FROM P1;

Thus, all the rows in P1 are selected and copied, and the copies are inserted into HP1.

At block 214, a mapping table is created. The mapping table maps storage locators that identify data items in P1 with storage locators that identify data items in HP1. An example of a storage locator is a row identifier (ID). Thus, each row ID in P1 maps to a row ID in HP1. The mapping table may comprise two columns: a source row ID column that stores row IDs of P1 and a target row ID column that stores row IDs of HP1. Although it is referred to as a "table," the mapping table may be a different type of data structure, such as a text file, an array of objects (or structs) that have two attributes, and a linked list of objects (or structs).

Block 214 may be performed within the same sub transaction that includes block 212. Block 214 may end by committing the sub transaction.

Local Index

At block 216, a local index partition is generated for HP1 for each local index partition that exists for P1. (A local index partition indexes only data from a corresponding table partition and not from any other table partition.) Thus, if three local index partitions exist for P1, then three local index partitions are generated for HP1. While one or more local index partitions are generated for HP1, such local index partitions are not visible to user-initiated queries. Thus, such local index partitions are also considered "hidden."

Block 216 may be performed by executing a DDL statement, such as "ALTER INDEX i1 REBUILD PARTITION p1," where 'i1' is the local index and 'p1' is partition P1.

Each local index partition generated as part of block 216 may be generated in a separate sub transaction. Because the HP1 is not accessed yet, there are no concurrency issues while each local index partition is built.

If no local indexes exist for P1, then no local index will be generated for HP1. In such a scenario, block 216 is skipped.

Global Index

At block 218, data from the HP1 is loaded into each global index that exists for the table to which P1 belongs. (A global index is an index that indexes data from multiple partitions of a partitioned table, but where the partitioning of the global index (if at all) does not correspond to the partitioning of the partitioned table.) Thus, if there are two global indexes on the table, then each global index is updated to include data from HP1. Block 218 may be performed using one or more sub transactions. For example, one global index is updated in one sub transaction while another global index is updated in another sub transaction. As another example, multiple sub transactions may be used to update a single global index.

While a global index is being updated to index data from HP1, the global index can still be used to answer queries. Index entries that correspond to HP1 are considered "hidden" entries. "Hidden" index entries are marked as hidden or are associated with data that indicates that the index entries are hidden. For example, if the global index is accessed while process 200 is performed, then each accessed index entry may be checked to determine whether the index entry belongs to a partition that is hidden. If so, then the index entry is ignored.

In an embodiment, block 218 is not performed for "unique" global indexes. A unique global index is one that includes no more than one index entry for each key value. If block 218 is performed for a unique global index, then the unique global index would contain duplicate key values since HP1 contains many key values that are found in P1 (due to block 212). Thus, the unique global index would lose its unique property. Instead, unique global indexes are not updated based on HP1, at least not until after block 230, described below.

If no global indexes exists for the table, then no global index will be updated based on the data in HP1. In that scenario, block 218 is skipped.

Cooperation Phase

At block 220, cooperation is initiated (or "turned on") and journaling is turned off. Block 220 may be performed within the context of another sub transaction.

"Cooperation" involves a DML transaction making one or more changes to both P1 and HP1. Any DML transactions that begin after cooperation is turned on will no longer store changes to P1 in the journal. Thus, the journal is guaranteed to not increase anymore. Block 220 may be performed by setting a cooperation flag and unsetting a journaling flag, both of which are associated with P1. Thus, each partition of a partitioned table may include a journaling flag and a cooperation flag.

In an embodiment, cooperation involves updating the mapping table. For example, if a value is inserted into P1 at r89 and the value is inserted into HP1 at r323, then the mapping table is updated to associate r89 and r323. For example, r89 is stored in a source rowID column of the mapping table and r323 is stored in a target rowID column of the mapping table. The mapping table is also updated if there is a delete of a row.

Cooperation may involve checking the journal before making some changes. For example, for a DML transaction that requires an insert of a value, cooperation involves inserting the value into P1 and HP1. The journal is analyzed to determine whether the value already exists in the journal and the associated opcode indicates deletion. If both conditions are satisfied, then the opcode is modified to indicate an update.

For a DML transaction that requires deletion of a value, cooperation involves deleting the value from P1 and checking the journal for an insertion or update of the corresponding row (as indicated by a row ID). If the journal includes an entry that indicates insertion of the row that is to be deleted, then that entry in the journal is deleted. (Before the entry is deleted, the DML transaction that initiates the delete first obtains a lock on the entry so that the DDL transaction does not access the entry at the same time during block 224, which is described in detail below.) HP1 does not need to be updated. However, if the journal does not include an entry for the row that is to be deleted, then the original insert or update is already reflected in HP1. Thus, processing of the DML transaction involves identifying the row in the HP1 (using the row ID of the P1 and the mapping table) and deleting the value.

Cooperation may also involve maintaining any non-unique global indexes. Unique global indexes are not maintained during the cooperation phase. Otherwise, the unique global index would contain duplicates, which are not allowed.

At block 222, one or more cursors are invalidated. Block 222 is performed to ensure that any cursors that require journaling changes to P1 are not used going forward. Block 222 may end by committing the sub transaction that includes block 220.

Drain Phase

At block 224, the journal is "drained." "Draining" the journal involves applying the changes reflected in the journal to HP1 and removing those changes from the journal. Draining is performed by the DDL transaction that was initiated by the move partition instruction received in block 202 while cooperation is performed by DML transactions that are updating P1 while cooperation is turned on.

Draining the journal may be performed in one of multiple ways. For example, the following database statement may be executed for inserts indicated in the journal:

INSERT INTO HP1 AS
SELECT * FROM P1
WHERE rowID=r1, r3, r7, . . . ;

where the row identifiers listed in the WHERE clause are row identifiers that are indicated in the mapping table, that are of P1, and that correspond to an insert operation. Instead of generating and processing a single database statement (as above), multiple individual database statements may be generated and processed. For example, one database statement may be generated for r1, another database statement for r3, another database statement for r7, and so forth.

For inserts, the draining phase also comprises updating the mapping table. For example, if an entry in the journal indicated an insert at row 78 for P1, then the mapping table is updated to associate row 78 with a particular row (e.g., row 432) for HP1.

In an embodiment, before the DDL transaction applies an entry indicated in the journal, the DDL transaction first obtains a lock on the entry so that the DDL transaction and a cooperating DML transaction do not access the entry at the same time. After the lock is obtained, the entry may be deleted so that cooperating DML transactions will not consider the entry.

To account for deletes, the following database statement may be executed:

DELETE FROM HP1
  WHERE rowID=(SELECT target_rowID FROM mapping_table WHERE source_rowID=r2, r4, r5, . . . );

where 'target_rowID' is a column in the mapping table that stores row identifiers of HP1, 'source_rowID' is a column in the mapping table that stores row identifiers of P1, and the source row identifiers listed in the nested WHERE clause correspond to a delete operation. Instead of generating and processing a single database statement (as above), multiple individual database statements may be generated and processed. For example, one database statement may be generated for r2, another database statement for r4, another database statement for r5, and so forth.

An update may be implemented using a delete statement (similar to the one above) followed by an insert statement (similar to the one above). A difference for the update scenario is that the list of row identifiers in both statements would correspond to an update operation, as opposed to an insert operation or a delete operation.

While the above example statements initiate DML transactions on HP1, such DML transactions are allowed because they are executing within the context of the DDL transaction that began in block 202. HP1 remains hidden (or invisible) to DML transactions that are outside of the DDL transaction.

In an embodiment, block 224 is performed within a single sub transaction or multiple sub transactions so that each individual sub transaction is relatively small in terms of the number of rows that are processed.

In an embodiment, block 224 is performed before cooperation is turned on. However, the drain phase then may not be a complete drain because changes to P1 may be continually made as HP1 is updated as part of the drain phase. At some point, P1 may be locked so that no changes can be made to P1 or the journal and so that HP1 may be eventually made "visible" or online. However, in an embodiment, locks that would block DML transactions from accessing P1 are avoided altogether. Thus, in the embodiment where a drain of the journal is performed before cooperation is turned on, another drain of the journal is performed after cooperation is turned on. This may be done to reduce the impact that the cooperation has on performance, since cooperation may require more work to be performed by DML transactions than the work required for journaling.

Waiting

At block 226, a timestamp is determined. The timestamp is associated with a particular time at which (or after which) block 224 (i.e., where the journal was completely drained) ended. Thus, the timestamp may indicate when block 224 completed.

At block 228, the DDL transaction "waits" for one or more transactions that were pending at the particular time (associated with the timestamp) to commit. Such transactions may be only those that involve P1 or the table to which P1 belongs.

Identity Swap

At block 230, the identities of P1 and HP1 are swapped or exchanged. Swapping identities involves marking P1 as hidden and HP1 as unhidden and swapping a database object identifier of P1 with a database object identifier of HP1 Block 230 may begin by initiating another sub transaction.

Block 230 also involves swapping metadata of any local indexes of P1 and HP1 and making any local indexes on P1 hidden while making any local indexes on HP1 not hidden.

Block 230 also involves turning cooperation off with respect to P1. For example, a cooperation flag for P1 may be unset. DML transactions that begin after cooperation is turned off will only update HP1 (which is no longer hidden) and not P1 (which is now hidden). Also, such DML transactions will not access the journal as previous DML transactions did when cooperation was "turned on".

Clean Up Phase

At block 232, if any cursors exist for P1, then those cursors are invalidated. Invalidating such cursors ensures that cooperation is not used for any future DML transactions. Block 232 may involve invalidating only cursors that target P1, only cursors that target the table to which P1 belongs, or all cursors. Also, block 232 may involve committing the sub transaction that began in block 230.

At block 234, a timestamp is determined. The timestamp is associated with a particular time at which (or after which) block 232 (i.e., where zero or more cursors were invalidated) ended. Thus, the timestamp may indicate when block 232 completed.

At block 236, the DDL transaction "waits" for one or more transactions that were pending at the particular time (associated with the timestamp) to commit. Such transactions may be all concurrent transactions, only those that involve the table to which P1 belongs, or only those that involve P1. This "waiting" is performed in order to wait for all cooperating DML transactions to commit. After block 236 completes, no DML transaction will "see" or attempt to access the journal.

Unique Global Index

As described previously, if a non-unique global index exists on P1, then the global index is updated to include data from HP1. However, the index entries that index data from HP1 are considered hidden index entries and, therefore, are ignored during query processing that involves accessing the global index. After block 230, P1 is hidden and access of the global index will go through HP1. Thus, processing a query against the global index after block 230 may involve accessing HP1.

As noted previously, in an embodiment, a unique global index is not updated with data from HP1 prior to block 238. Instead, at block 238, metadata (associated with each unique global index that exists for the table to which HP1 belongs) is updated to indicate that the mapping table is to be used to process queries that involve accessing the unique global index(es). Thus, the mapping table is used to redirect from an "old" partition to a "new" partition. For example, if an index entry in a unique global index is identified as part of processing a query, then a row ID indicated in the index entry is identified and used to identify a matching source row ID in the mapping table. A corresponding target row ID is (1) identified in the mapping table based on the source row ID and (2) used to access the corresponding row in HP1.

In an embodiment, unique global indexes are "patched" to replace row IDs of rows in P1 with row IDs of rows in HP1 (as indicated in the mapping table). Such a patch may occur continuously in the background while the unique global indexes are accessible for query processing. Such a patch may occur before or after process 200 has completed. After some, but not all, index entries are "patched," a query execution engine may access an index entry of a unique global index. The index entry must be checked to determine whether the index entry corresponds to HP1 or P1. This determination may be made by determining whether a row ID indicated in the index entry is found among the source row IDs (i.e., row IDs of P1) indicated in the mapping table. If so, then the index entry must not have been patched yet and the corresponding target row ID is fetched from the mapping table. If not, then the index entry has been patched and the row ID may be used to access HP1. Alternatively, the determination of whether an index entry corresponds to HP1 or P1 is to identify an object number encoded in the row ID of the index entry and compare that object number with one or more object numbers listed in metadata associated with the unique global index. If there is a match, then the index entry has not yet been patched and the mapping table is used to identify the corresponding row ID. If there is no match, then the index entry has been patched and the row ID indicated in the index entry may be used to access HP1.

At block 240, P1, the mapping table, and the journal are dropped or deleted. These objects are not needed anymore for the move partition operation. In a related embodiment, the journal is dropped prior to block 238.

At block 242, the DDL transaction that began in block 202 commits. At this point, HP1 is current (or up to date) and not hidden, and future DML transactions that would have updated P1 (which is hidden) instead update HP1.

Process 200 may be performed without requiring any blocking locks. Thus, no DML transactions that update P1 (or HP1 after the identity swap) is blocked and, therefore, does not have to wait for any part of the DDL transaction to complete.

Other Types of Operations

As noted previously, while the above description is in the context of moving a partition online, embodiments are not limited to this context. Techniques described herein may be applied to splitting a partition and merging partitions.

Splitting a partition involves creating two or more partitions from a single partition (or creating one or more new partitions by transferring a subset of the data from the single partition to the one or more new partitions, deleting that subset from the single partition, and retaining the single partition). Thus, instead of a single hidden partition, splitting a partition using techniques disclosed herein may involve creating two or more hidden partitions. A single mapping table may be created and used or a different mapping table may be created and used for each hidden partition. Also, if the single partition is still used, then the identity swap becomes instead a metadata update where metadata of the single partition is updated to indicate the new partitioning criteria for the single partition, whether the partitioning is list-based, range-based, or hash-based. Also, if the single partition is still used, then data that is exists in the single partition that now belongs to a new partition is dropped from the single partition.

Merging partitions involves merging two or more partitions into a single partition. For example, partitions 1, 2, 3, and 4 are merged into partition 1 or into a new partition. Thus, merging partitions may only involve a single hidden partition. Again, a single mapping table may be created and used or a different mapping table may be created and used for each partition that is to be merged. Also, if an existing partition is still used as the resulting partition, then the identity swap becomes instead a metadata update where metadata of the existing partition is updated to indicate the new partitioning criteria for the existing partition.

Additionally, while a hidden partition is described herein as being used to facilitate a move partition operation (or a split or merge partition operation), a hidden partition may be used in other contexts. For example, a hidden object may be created and used in the context of online conversion of a non-partitioned table to a partitioned table. As another example, a hidden object may be created and used in the context of a moving a non-partitioned table.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
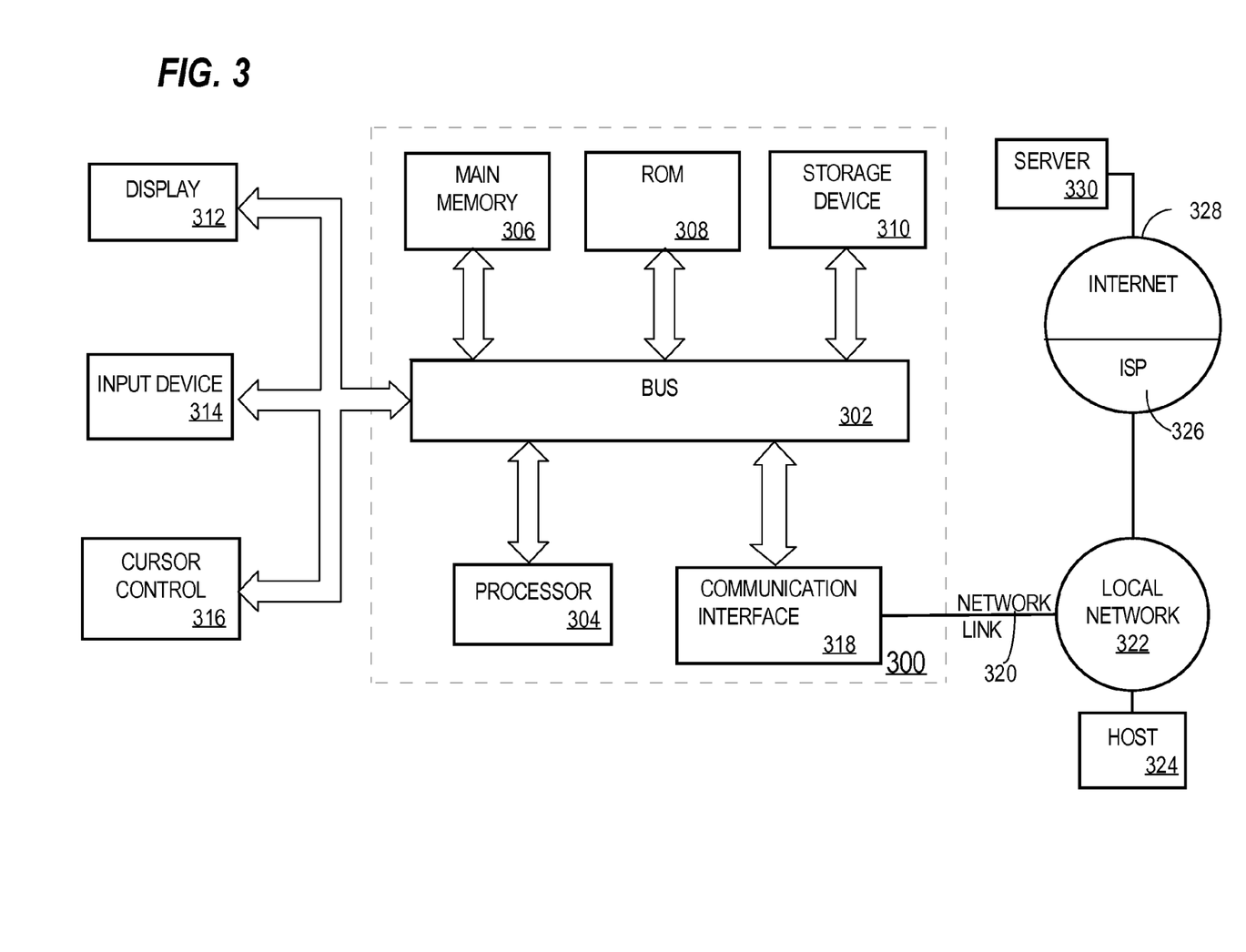
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving an instruction, that is initiated by a first user, to move a partition to a new storage location, to split the partition into two or more partitions, or to merge a plurality of partitions that includes the partition into a single partition;
   in response to receiving the instruction and while allowing a plurality of transactions, that are initiated by a plurality of users, to modify data reflected in the partition, performing an operation that moves, splits, or merges the partition;
   wherein performing the operation comprises:
      creating a new partition that the plurality of transactions cannot access;
      copying data, from the partition that the plurality of transactions can access, into the new partition;
   wherein the method is performed by one or more computing devices.

2. The method of claim 1, wherein performing the operation further comprises:
   generating journaling metadata that indicates that transactions are to store change information, caused by the transactions, in a journal;
   after generating the journaling metadata, generating cooperation metadata that indicates that subsequent transactions are to check the journal and apply changes, caused by the subsequent transactions, to the new partition.

3. The method of claim 2, further comprising:
   in response to determining a particular time after the journaling metadata is generated and before the cooperation metadata is generated, waiting for one or more transactions that were pending at the particular time to commit before copying the data.

4. The method of claim 2, further comprising:
   after generating the cooperation metadata, identifying a particular change in the journal and applying the particular change to the new partition.

5. The method of claim 4, wherein:
   identifying and applying are performed by a process that is executing a data definition language (DDL) transaction that began prior to creating the new partition;

the process performs copying the data, generating the journaling metadata, and generating the cooperation metadata.

6. The method of claim 2, further comprising:
in response to determining a particular time that the journal does not contain any change entries that have not been applied to the new partition, waiting for one or more transactions that were pending at the particular time to commit before exchanging identities of the partition and the new partition.

7. The method of claim 2, further comprising:
after generating the cooperation metadata, exchanging identities of the partition and the new partition.

8. The method of claim 2, further comprising invalidating one or more first cursors after creating the journal and invalidating one or more second cursors after generating the cooperation metadata.

9. The method of claim 1, wherein performing the operation comprises:
determining whether a local index exists for the partition;
in response to determining that a local index exists for the partition, generating a new local index for the new partition.

10. The method of claim 1, further comprising:
generating a plurality of mappings, each of which maps a location identifier for the partition with a location identifier for the new partition.

11. The method of claim 1, further comprising:
determining that a global index exists for the partition;
in response to receiving a query:
identifying an entry in the global index,
identifying a first location identifier that is indicated in the entry,
based on a mapping in a plurality of mappings, identifying a second location identifier that corresponds to the first location identifier,
using the second location identifier to retrieve data from the new partition.

12. The method of claim 1, wherein performing the operation is part of one transaction that is different than the plurality of transactions.

13. The method of claim 1, wherein a transaction in the plurality of transactions includes inserting new data into the partition, deleting existing data from the partition, or updating the existing data to create updated data.

14. One or more non-transitory storage media storing instructions which, when executed by one or more computing devices, cause:
receiving an instruction, that is initiated by a first user, to move a partition to a new storage location, to split the partition into two or more partitions, or to merge a plurality of partitions that includes the partition into a single partition;
in response to receiving the instruction and while allowing a plurality of transactions, that are initiated by a plurality of users, to modify data reflected in the partition, performing an operation that moves, splits, or merges the partition;
wherein performing the operation comprises:
creating a new partition that the plurality of transactions cannot access;
copying data, from the partition that the plurality of transactions can access, into the new partition.

15. The one or more non-transitory storage media of claim 14, wherein performing the operation further comprises:
generating journaling metadata that indicates that transactions are to store change information, caused by the transactions, in a journal;
after generating the journaling metadata, generating cooperation metadata that indicates that subsequent transactions are to check the journal and apply changes, caused by the subsequent transactions, to the new partition.

16. The one or more non-transitory storage media of claim 15, wherein the instructions, when executed by the one or more computing devices, further cause:
in response to determining a particular time after the journaling metadata is generated and before the cooperation metadata is generated, waiting for one or more transactions that were pending at the particular time to commit before copying the data.

17. The one or more non-transitory storage media of claim 15, wherein the instructions, when executed by the one or more computing devices, further cause:
after generating the cooperation metadata, identifying a particular change in the journal and applying the particular change to the new partition.

18. The one or more non-transitory storage media of claim 17, wherein:
identifying and applying are performed by a process that is executing a data definition language (DDL) transaction that began prior to creating the new partition;
the process performs copying the data, generating the journaling metadata, and generating the cooperation metadata.

19. The one or more non-transitory storage media of claim 15, wherein the instructions, when executed by the one or more computing devices, further cause:
in response to determining a particular time that the journal does not contain any change entries that have not been applied to the new partition, waiting for one or more transactions that were pending at the particular time to commit before exchanging identities of the partition and the new partition.

20. The one or more non-transitory storage media of claim 15, wherein the instructions, when executed by the one or more computing devices, further cause:
after generating the cooperation metadata, exchanging identities of the partition and the new partition.

21. The one or more non-transitory storage media of claim 15, wherein the instructions, when executed by the one or more computing devices, further cause:
invalidating one or more first cursors after creating the journal and invalidating one or more second cursors after generating the cooperation metadata.

22. The one or more non-transitory storage media of claim 14, wherein performing the operation comprises:
determining whether a local index exists for the partition;
in response to determining that a local index exists for the partition, generating a new local index for the new partition.

23. The one or more non-transitory storage media of claim 14, wherein the instructions, when executed by the one or more computing devices, further cause:
generating a plurality of mappings, each of which maps a location identifier for the partition with a location identifier for the new partition.

24. The one or more non-transitory storage media of claim 14, wherein the instructions, when executed by the one or more computing devices, further cause:
determining that a global index exists for the partition;
in response to receiving a query:

identifying an entry in the global index,
identifying a first location identifier that is indicated in the entry,
based on a mapping in a plurality of mappings, identifying a second location identifier that corresponds to the first location identifier,
using the second location identifier to retrieve data from the new partition.

25. The one or more non-transitory storage media of claim 14, wherein performing the operation is part of one transaction that is different than the plurality of transactions.

26. The one or more non-transitory storage media of claim 14, wherein a transaction in the plurality of transactions includes inserting new data into the partition, deleting existing data from the partition, or updating the existing data to create updated data.

* * * * *